(12) United States Patent
Bradski

(10) Patent No.: US 7,246,100 B2
(45) Date of Patent: Jul. 17, 2007

(54) CLASSIFYING AN ANALOG VOLTAGE IN A CONTROL SYSTEM USING BINARY CLASSIFICATION OF TIME SEGMENTS DETERMINED BY VOLTAGE LEVEL

(75) Inventor: Gary R. Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 11/005,128

(22) Filed: Dec. 6, 2004

(65) Prior Publication Data

US 2006/0179020 A1    Aug. 10, 2006

(51) Int. Cl.
G06N 5/00    (2006.01)
(52) U.S. Cl. .............................. 706/12; 706/45; 706/47
(58) Field of Classification Search .................. 700/17; 714/4; 706/12, 25, 45, 47; 348/144
See application file for complete search history.

(56) References Cited

U.S. PATENT DOCUMENTS

| | | | | |
|---|---|---|---|---|
| 4,267,562 A | * | 5/1981 | Raimondi | 348/144 |
| 5,634,087 A | * | 5/1997 | Mammone et al. | 706/25 |
| 5,875,108 A | * | 2/1999 | Hoffberg et al. | 700/17 |
| 6,363,160 B1 | | 3/2002 | Bradski et al. | 382/103 |
| 6,394,557 B2 | | 5/2002 | Bradski | 302/103 |
| 6,671,818 B1 | * | 12/2003 | Mikurak | 714/4 |

OTHER PUBLICATIONS

Andrew W. Moore "K-means and Hierarchical Clustering" www.cs.cmu.edu. Nov. 16, 2001.
D. Comaniciu and P. Meer, "Distribution free decomposition of multivariate data", Pattern Analysis & Applications. vol. 2. pp. 22-30. 1999.
Wald, Lecture II, "Looking inside the Black Box", Leo Breiman, http://slat-www.berkeley.edu/users/breiman/wasI2002-2.pdf.    pp. 19-35. Feb. 2002.
Andrew Y. Ng, Michael I. Jordan, Yair Weiss. "On Spectral Clustering: Analysis and an algorithm". 2001.
E.M. Kleinberg, "On the algorithmic implementation of stochastic discrimination", IEEE Transactions on Pattern Analysis and Machine Intelligence, PAMI-22, 5, May 2000, Abstract.
Dechang Chen, Peng Huang and Xiuzhen Cheng. "A concrete statistical realization of Kleinberg's stochastic discrimination for pattern recognition. Part I. Two-class classification" Source: Ann. Statistic. 31 (2003), No. 5. Abstract.

* cited by examiner

*Primary Examiner*—Wilbert L. Starks, Jr.
(74) *Attorney, Agent, or Firm*—Trop, Pruner & Hu, P.C.

(57) ABSTRACT

In one embodiment, the present invention includes a method of successively splitting an analog function into high and low ranges and calculating a binary mask for these ranges to obtain a plurality of data regions at a plurality of split levels, and training binary classifiers on the plurality of data regions of at least one of the split levels. In such manner, binary classifiers may be used to classify an analog function. Other embodiments are described and claimed.

14 Claims, 7 Drawing Sheets

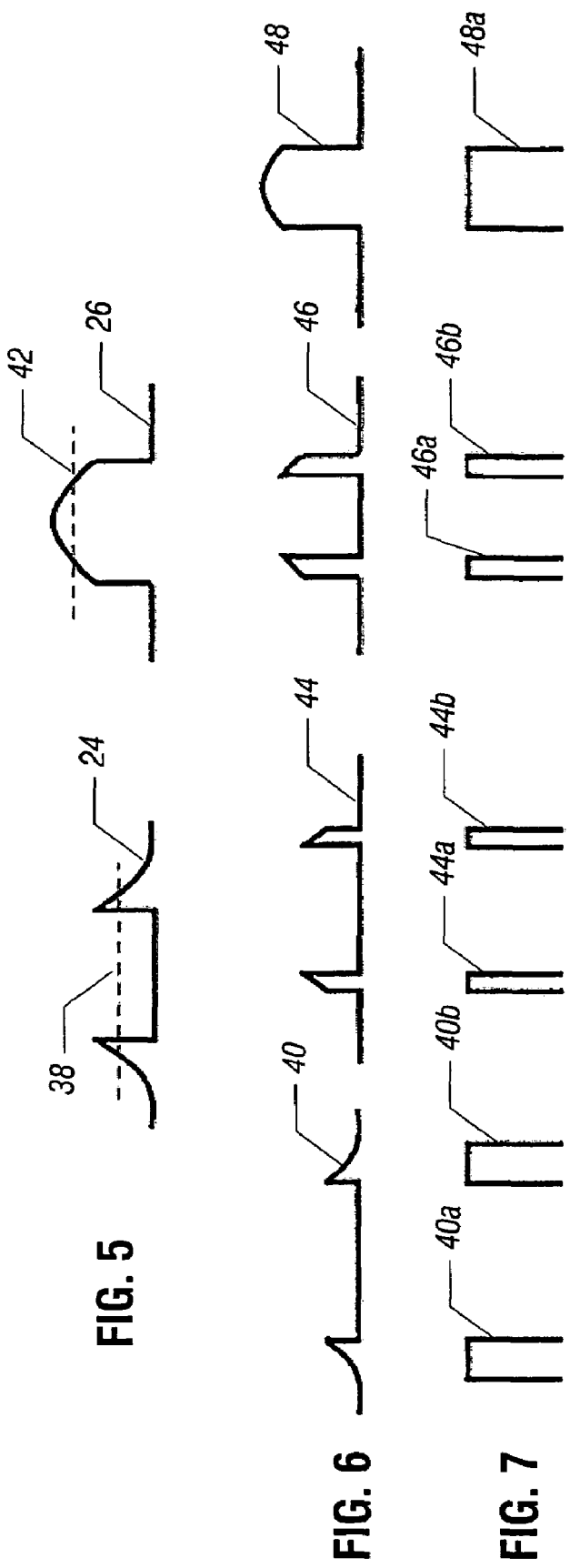

CLASSIFYING AN ANALOG VOLTAGE IN A CONTROL SYSTEM USING BINARY CLASSIFICATION OF TIME SEGMENTS DETERMINED BY VOLTAGE LEVEL

BACKGROUND

This invention relates generally to data mining.

Data mining involves the statistical analysis of complex data. In one application, data mining technology may be utilized to implement machine learning. Generally, data mining may be used to learn from data. Data features enable predictions to be made. A training set of data may be observed to find the combination and weighting of those features that are determinative of data outcomes of interest. A predictive model is developed to predict a corresponding outcome based on the previously found combination and weighting of features as they appear in new data.

A data set may include a collection of data points, each of which has a set of features. Supervised data contains labels or predictors. That is, a data set may contain a collection of features and a label or predictor for those features. As an example, a data set may include a collection of features about mushrooms, such as cap type, color, texture, and so on, and a label such as edible, poisonous, medicinal, and so on, or a predictor, such as a numeral value representing the toxicity of a mushroom.

Binary classifiers are among the most mature pattern recognition tools. Binary classifiers are trained on M feature vectors F: $f_1, f_2, \ldots, f_N$, each of which has one of two possible class labels, C: 0 or 1. Once trained, these classifiers learn a mapping from F to C. In a performance or test mode, a usually new feature point with no label is presented to the classifier which then maps it to either class 0 or class 1. Such binary classifiers include tree-based classifiers.

Tree-based classifiers make sequential decisions on a selected feature at each branch point in order to arrive at a final label or prediction at the leaves of a tree. A classifier may be used to decide which data points meet a given criteria. At each branch point, data points are sorted into their appropriate branch according to how they meet the criterion. This classification proceeds downwardly from a root or starting point to leaves or ending points. A forest consists of many trees, each of which gives a weighted vote for the label or prediction value.

A kernel uses a radial kernel, such as a Gaussian kernel, to measure distances between data points and kernel centers. Kernel methods achieve localization using a weighting function of each kernel that assigns a weight to a data point based on its distance from each kernel center. Nearest neighbor classifiers associate a label or predictor of a new point with that of its nearest neighboring points. Classification is based on the majority vote of those nearest neighbors.

Another type of binary classifier is a stochastic discrimination binary classifier, in which the law of large numbers is leveraged, resulting in a classifier that does not overtrain and obtains quality recognition scores. However, stochastic discrimination only operates on binary variables.

Accordingly, a need exists to better classify analog or continuous data, such as an analog function, using these more mature classification techniques.

BRIEF DESCRIPTION OF THE DRAWINGS

FIG. 5 is a graphical representation of the analog functions under the binary masks of FIG. 4.

FIG. 6 is a graphical representation of low portions and high portions of the analog function of FIG. 5.

FIG. 7 is a binary representation of the split analog function of FIG. 6.

FIG. 8 is a flow diagram of a testing method in accordance with one embodiment of the present invention.

DETAILED DESCRIPTION

In various embodiments, a binary classifier may be used to classify an analog function. To do so, the analog function may be split into a number of different binary parts by thresholding around a mean level of each of the parts. When the analog function has been split to the desired level, there are $2^L$ data regions corresponding to different possible levels of the analog function, where L is the number of splits. Then, a classifier may be trained for each data region of one or more selected levels. More specifically, a binary classifier may be trained at each region by treating the binary mask corresponding to that region as "one" or "true", and all remaining regions as "zero" or "false". In such manner, binary classifiers corresponding to the selected level may be obtained and used to classify data points input to the classifiers during a testing phase.

Figure 1:
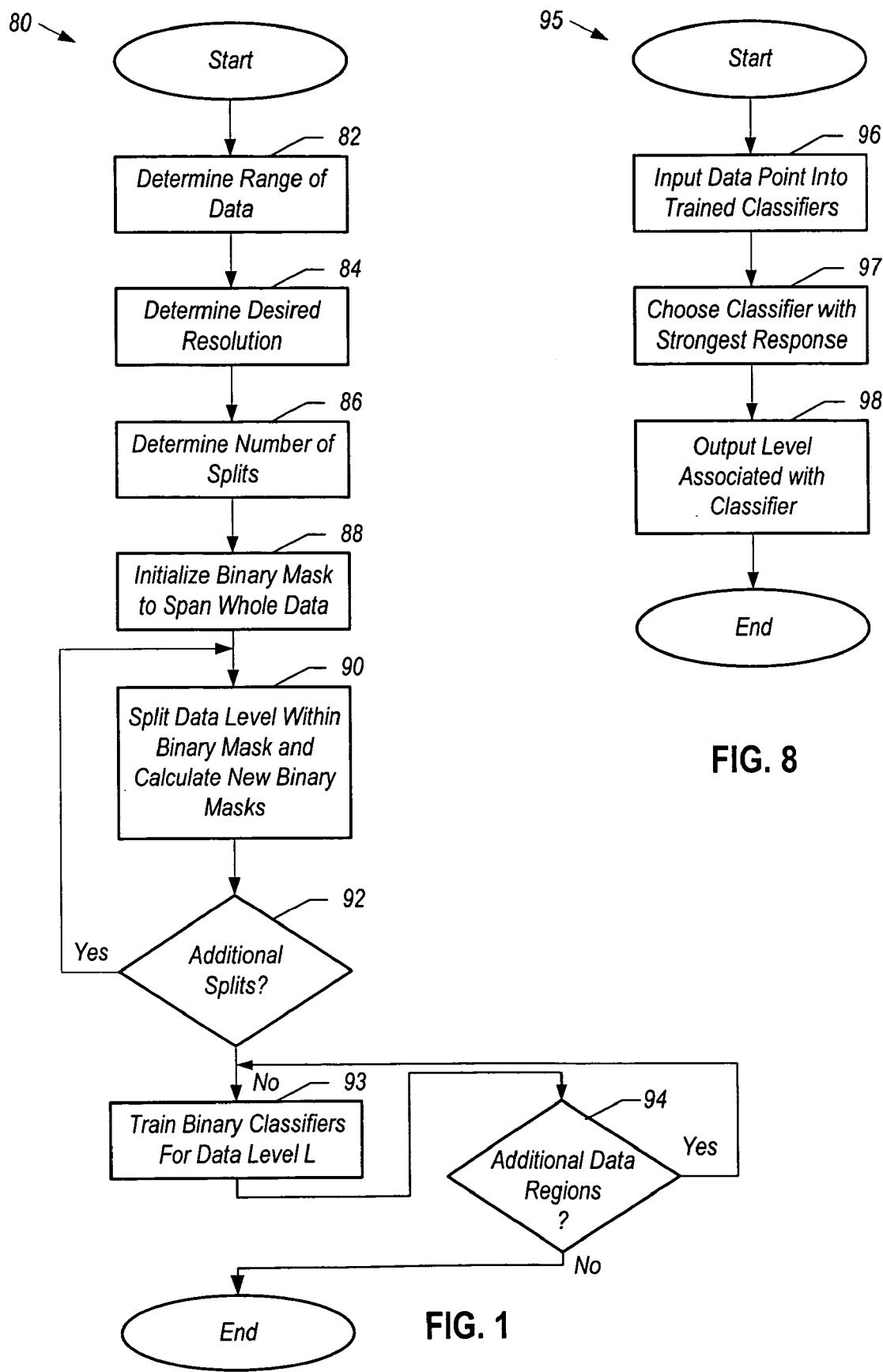
FIG. 1 is a flow diagram of a method in accordance with one embodiment of the present invention.

Referring now to FIG. 1, shown is a flow diagram of a method in accordance with one embodiment of the present invention. More specifically, a method 80 of FIG. 1 may be used in a serial machine to classify an analog function using binary classifiers. However, it is to be understood that method 80 also may be suitable for multiprocessor or clustered machines. Method 80 may be a software routine, and may begin by determining a range of data (block 82). The data may correspond to an analog function. For example, an analog function may correspond to a voltage that fluctuates between zero and 12 volts. For such an example, the range may be 12. Then, a desired resolution for the function may be determined (block 84). In the above example, assume the desired resolution is 0.012 volts (V). Then, the number of splits may be determined (block 86). In one embodiment the number of splits, L, may be solved according to the following equation:

$$L = (\log 2)^{-1} \cdot \log(\text{range}/\text{resolution}) \quad [1]$$

In various embodiments, different resolutions maybe used in different parts of a feature space, as desired by a user.

A binary mask may be initialized to span the whole analog function (block 88). The data level within the binary mask may be split and new binary masks may be calculated for each sub data set (block 90). In various embodiments, the data level may be split at the mean level within the binary mask for each sub data set. However, the function need not be split at the mean value; any split point that lies within the range of the data may be selected. However, using the mean value may be a good heuristic if nothing else is known about the data. The splitting of the data level and calculating of new masks may be performed for the number of splits determined. Thus, at the lowest split level, there are $2^L$ data regions corresponding to different possible levels of the analog function.

After each split, it may be determined whether additional splits are present (diamond 92). If so, control returns to block 90. If not, control passes to block 93.

Upon completion of splitting of the analog function to the desired number of splits, a plurality of binary classifiers may be trained to classify the multi-class problem at this lowest split level. Accordingly, binary classifiers may be trained for each of the $2^L$ data regions of the lowest split level (block 93). After training the binary classifier, the function level associated with the classifier may be noted. For example, each classifier may have a data region identifier. While described as classifying at the lowest split level, in other embodiments, multiple levels may be classified.

After training a binary classifier, it may be determined whether additional data regions remain to be trained (diamond 94). If so, control returns to block 93. If not, method 80 concludes. In some embodiments, method 80 may be performed in each of many preselected subregions of the data feature space to better distribute the algorithm for multiprocessor or cluster architectures.

In different embodiments, various binary classifiers may be used. For example, a tree-based classifier, a kernel, a nearest neighbor classifier or another such classifier may be used. To train the binary classifiers for the analog function, for each classifier corresponding to a data region (i.e., a different possible level) of the analog function, the binary mask for that region may be treated as a class 1 (or true), and all remaining regions as a class 0 (or false) (or vice versa). For some binary classifiers, certain data sets may be rebalanced if the class 1 versus class 2 becomes too unbalanced.

Figure 2:
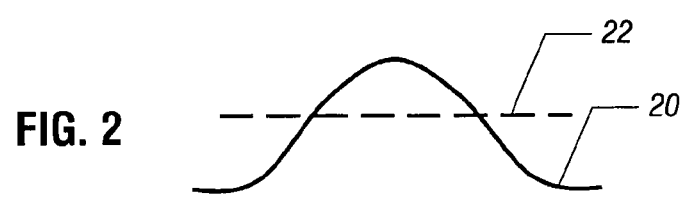
FIG. 2 is a graphical representation of an analog function that may be used to train a classifier in accordance with an embodiment of the present invention.
Figure 3:
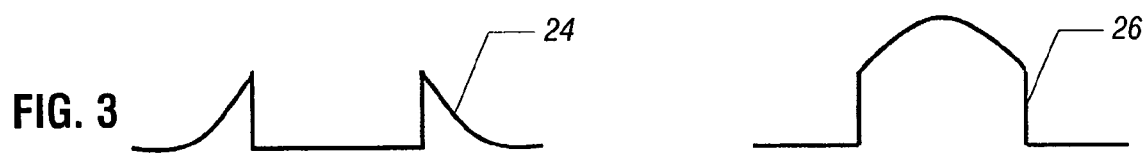
FIG. 3 is a graphical representation of splitting the analog function of FIG. 2 in accordance with one embodiment of the present invention.

Referring now to FIG. 2, shown is a graphical representation of an analog function that may be used to train a classifier in accordance with an embodiment of the present invention. As shown in FIG. 2, a continuous function 20 has a mean level 22 associated therewith. FIG. 3 is a graphical representation of splitting the analog function of FIG. 2. That is, FIG. 3 shows a splitting of analog function 20 into binary parts by thresholding around mean level 22. Thus as shown in FIG. 3, analog function 20 may be split into a low range or portion 24 and a high portion 26. Each of these portions then may be converted into a binary scheme for classification.

Figure 4:
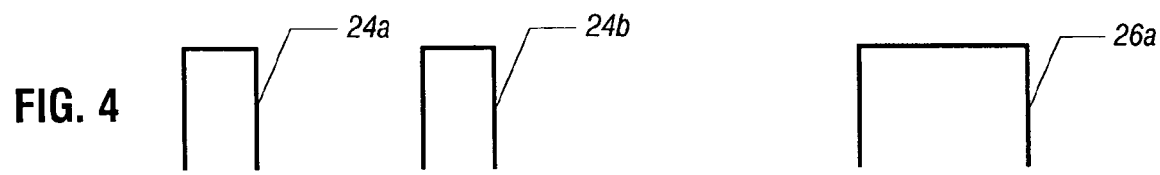
FIG. 4 is a binary representation of the low and high ranges of FIG. 3.

Referring now to FIG. 4, shown is a binary representation of the low and high ranges of FIG. 3. For example, as shown in FIG. 4, low range 24 may have a binary mask applied thereto such that the positive portions are represented by binary masks 24a and 24b. Similarly, high portion 26 may be represented by corresponding binary mask 26a.

As discussed above, the analog function may be split a number of times to obtain a desired resolution. Accordingly, low portion 24 and high portion 26 of FIG. 3 may be further split. Thus a mean under the binary masks of FIG. 4 may be calculated for the high and low portions. Referring now to FIG. 5, shown is a graphical representation of the analog function under the binary masks of FIG. 4. For example, FIG. 5 shows low portion 24 having a mean level of 38 associated therewith and high portion 26 having a mean level 42 associated therewith.

Next, the high and low portions may themselves be split into binary parts by thresholding around the mean level. Thus as shown in FIG. 6, low portion 24 may be split into a first low portion 40 and a second low portion 44, while high portion 26 may be split into a first high portion 46 and a second high portion 48.

Then, binary masks may be associated with these portions. Accordingly, FIG. 7 shows binary masks for the split analog function of FIG. 6. As shown in FIG. 7, first low portion 40 of FIG. 6 may have corresponding binary masks 40a and 40b associated therewith, while second low portion 44 of FIG. 6 may have corresponding binary masks 44a and 44b associated therewith. Similarly, first high portion 46 of FIG. 6 may have binary masks 46a and 46b associated therewith, while second portion 48 of FIG. 6 may have a binary mask 48 associated therewith. This splitting process may be continued until the desired resolution is reached.

When the desired range of accuracy is reached at the desired resolution range, binary classifiers may be used to classify each data region of that level by treating the selected region as class 1 and all other regions as class 0 (or vice versa). Training of multiple classifiers each corresponding to one of the data regions proceeds by iteratively selecting the corresponding region as class 1 and all other regions as class 0 (or vice versa).

Upon completion of such training, the classifiers may be used to classify new feature points input into the classifiers. That is, a new feature point may be classified as within a given classifier's level of accuracy. In such manner, the binary classifiers may perform continuous classification to handle surface regressions and other analog functions. In some embodiments, additional robustness may be obtained by also using earlier levels of splits (i.e., larger scales) to confirm the range of such test points.

Referring now to FIG. 8, shown is a flow diagram of a testing method in accordance with one embodiment of the present invention. Such a testing method may be used to classify one or more new feature points. As shown in FIG. 8, method 95 may be used to test data points using the plurality of trained classifiers. First, the data point may be input into the trained classifiers (block 96). The classifier providing the greatest response for the input data point may be chosen (block 97). Furthermore, the output level associated with that classifier may be output (block 98). Thus an input data point may be indicated to have a given level by running it through the trained classifiers.

The method of FIG. 1 discussed above for training binary classifiers may also be used in connection with stochastic discrimination. However, in other embodiments, a more direct algorithm may be used to perform stochastic discrimination. For highly parallel, cluster-like machines, one may take advantage of the distributive nature of stochastic discrimination, which randomly places many "boxes", each a "weak classifier" into a data feature space. In such manner, embodiments of the present invention may be used to provide for classification of analog functions using stochastic discrimination binary classifiers. Such stochastic discrimination classifiers include procedures to assure that the law of large numbers applies. In such manner, a classifier is created that is not overtrained and obtains high recognition scores. Because of the independence of the different classifiers, such stochastic discrimination classifiers may lend themselves to a highly distributed architecture with independence from other classifiers and high data locality.

Figure 9:
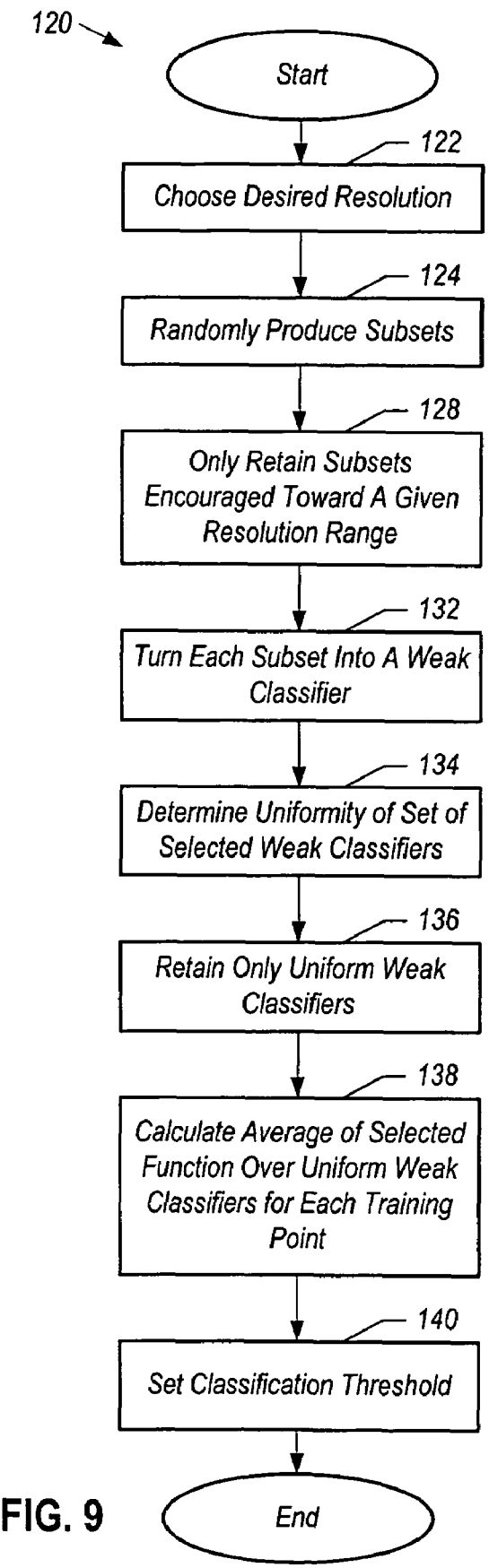
FIG. 9 is flow diagram of a stochastic discrimination method in accordance with one embodiment of the present invention.

Referring now to FIG. 9, shown is flow diagram of a stochastic discrimination method in accordance with one embodiment of the present invention. As shown in FIG. 9, method 120, which may be a software routine, may begin by choosing a desired resolution (block 122). Instead of a single desired resolution for the analog function, in some embodiments certain data spaces within the function may have different resolutions. Then, subsets of the analog function may be randomly produced (block 124). For example, random boxes or unions of such boxes may be randomly produced within the feature space. In various embodiments, a large number S of such subsets may be produced. While the number of such boxes may vary, in certain embodiments between 25 and 50 such boxes may cover each data point, although the scope of the present invention is not so limited. Furthermore, in some embodiments heuristics may be set to determine a number of boxes, such as setting the number of boxes equal to the square root of the number of data points, or that on average, each point is covered by a predetermined number of boxes, such as 30.

After these subsets are produced, certain manipulations may be performed on the subsets to determine which of the subsets are encouraged towards a given resolution range. Based on these manipulations, only the subsets encouraged towards a given resolution range may be retained (block 128). While the mechanisms to determine whether subsets are encouraged towards a given resolution may vary, in one embodiment the determination may be based on setting training points within a given subset to a first value and all other training points to a second value, and determining whether a greater relative fraction of the points are within any of the resolution ranges.

For example, in one embodiment, only subsets encouraged towards a given resolution range may be retained as follows:

a. for each resolution range within the subset, call the points in the subset within that resolution range "red", call all other points "green";

b. fix a nonnegative number c, where c is positive; and c. measure a fraction $r(TR,S)$ (where TR is the training set) of training red points and the fraction $g(TR,S)$ of training green points that the subset contains. More precisely, if TR is the training set, S is the current subset and red(TR), red(S) (and gre(TR),gre(S)) indicate the subset of red points (and green points) in the training set and the current subset:

i. $r(TR,S)=|\text{red}(TR) \cap \text{red}(S)|/|\text{red}(TR)|$; and [2]

ii. $g(TR,S)=|\text{gre}(TR) \cap \text{gre}(S)|/|\text{gre}(TR)|$ [3]

d. retain the subset S only if $r(TR,S)-g(TR,S)>c$.

Thus, only subsets meeting this test are retained.

Each subset may then be turned into a weak classifier (block 132). For example, any point outside the subset may be classified as green, while any point within the subset may be classified as red. The classifier may then be notated with its associated "red" resolution range.

Next, the uniformity of the selected weak classifiers may be determined (block 134). For example, for every training point q classified as red by a subset, the number of previous classifiers RS (q) that classify q as red (e.g., in a given resolution range) may be calculated. Then an average "ARS" of RS (q) over all points q classified as red by the subset may be calculated. Similarly, for every red training point q, the number of previous classifiers RTR (q) that classify q as red may be calculated and an average "ARTR" of RTR (q) over all red training points may be calculated.

Still referring to FIG. 9, only uniform weak classifiers may be retained (block 136). For example, continuing with the embodiment described above, if the average of red training points (ARS) is less than the average of all training red points (ARTR), the classifier may be retained. In other words, if ARS is less than ARTR, the classifier is retained. Otherwise the classifier is discarded.

Next, the average of the selected function over uniform weak classifiers for each training point may be calculated (block 138). Continuing with the above described embodiment, for each training point q, an average wr(q) over all weak classifiers may be calculated for the following function $x(q,S)$:

a. $x(q,S)=(1-r(TR,S))/(r(TR,S)-g(TR,S))$, [4]

if the classifier S classifies the point q as red; or b. $x(q,S)=(-r(TR,S))/(r(TR,S)-g(TR,S))$, [5]

if the classifier S classifies the point q as green. Finally, the classification threshold may be set (block 140). In one embodiment, the classification threshold may be set at ½.

Figure 10:
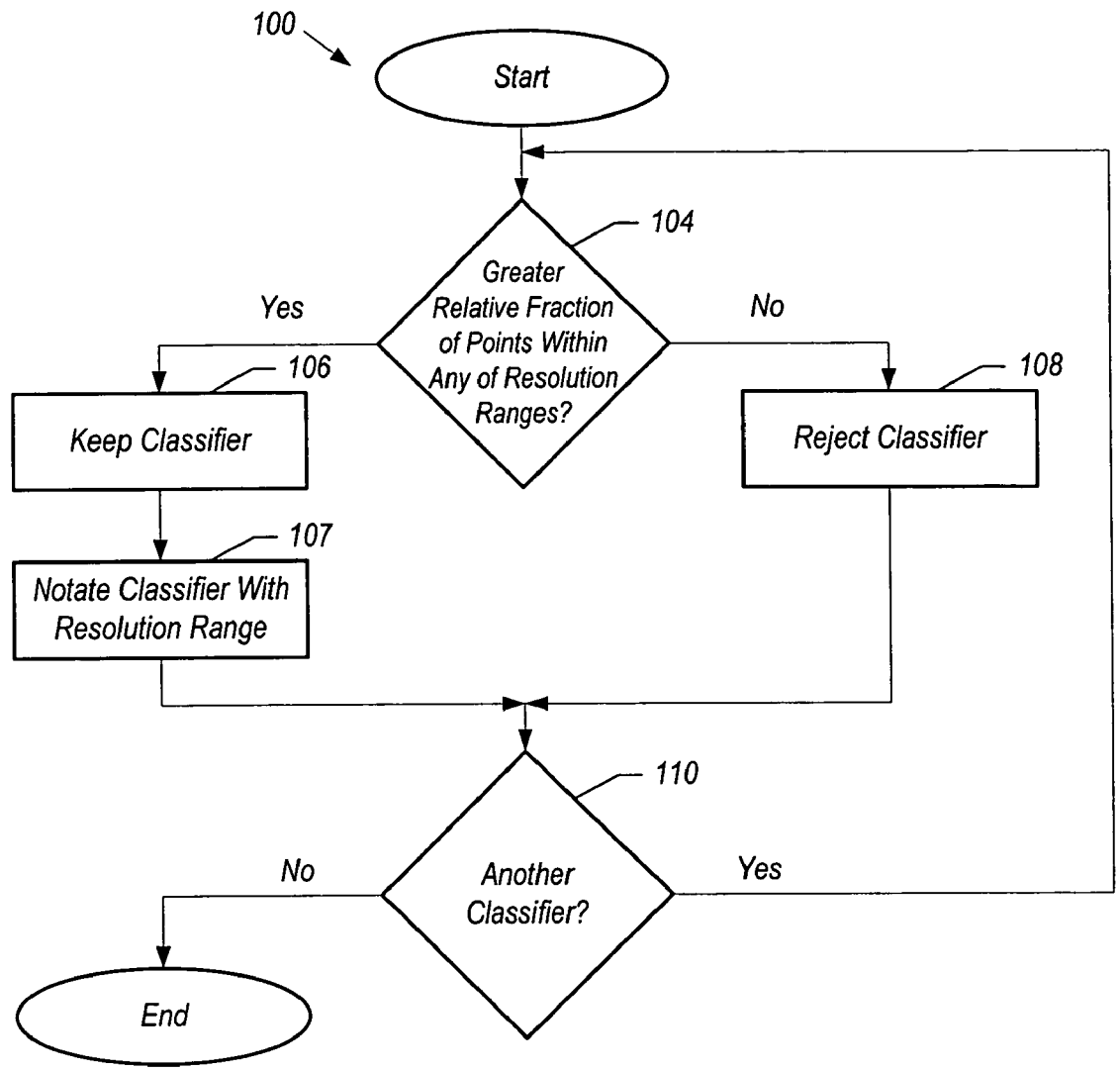
FIG. 10 is a flow diagram of a method of checking the uniformity of a set of weak classifiers in accordance with one embodiment of the present invention.

As discussed above, determining whether to retain weak classifiers may be performed in a variety of manners. In one embodiment, the weak classifiers may be retained in accordance with the method set forth in FIG. 10. Referring to FIG. 10, shown is a method of checking the uniformity of a set of weak classifiers in accordance with an embodiment of the present invention. As shown in FIG. 10, method 100 may begin by determining whether a greater relative fraction of points of a candidate weak classifier are within any of the resolution ranges (diamond 104). If so, the classifier may be retained (block 106), and the classifier may be notated with the indicated resolution range (block 107).

If instead at diamond 104 it is determined that the greater relative fraction of points are not within any of the ranges, the classifier may be rejected (block 108). From either block 107 or block 108, control passes to block 110, where it is determined whether another weak classifier is present. If so, control returns to block 104 for further analysis. If not, method 100 concludes.

Figure 11:
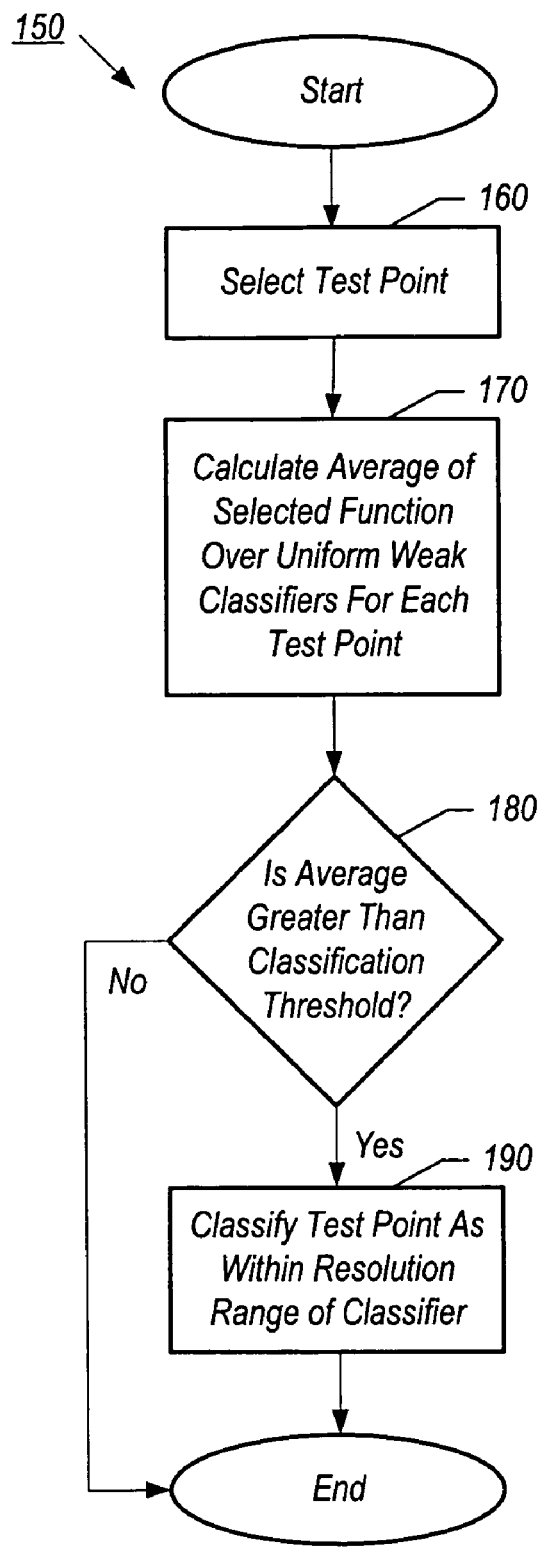
FIG. 11 is a flow diagram of a method of testing incoming data points in accordance with one embodiment of the present invention.

Upon completion of training, the weak classifiers may be used to test data points to determine whether such data points are within a desired resolution range. Referring now to FIG. 11, shown is a flow diagram of a method of testing incoming data points. As shown in FIG. 11, method 150 begins by selecting a test point (block 160). Next, an average of the selected function for the uniform weak classifiers may be calculated for each test point (block 170). It is then determined whether the average is greater than the classification threshold (diamond 180). As discussed above, in one embodiment the classification threshold may be set at 0.5. If it is determined that the average is greater than the classification threshold, control passes to block 190, where the test point is classified at being within the resolution range of the classifier (block 190). In contrast, if the average is not greater than the classification threshold, the test point is not so classified, and the method ends.

Figure 12:
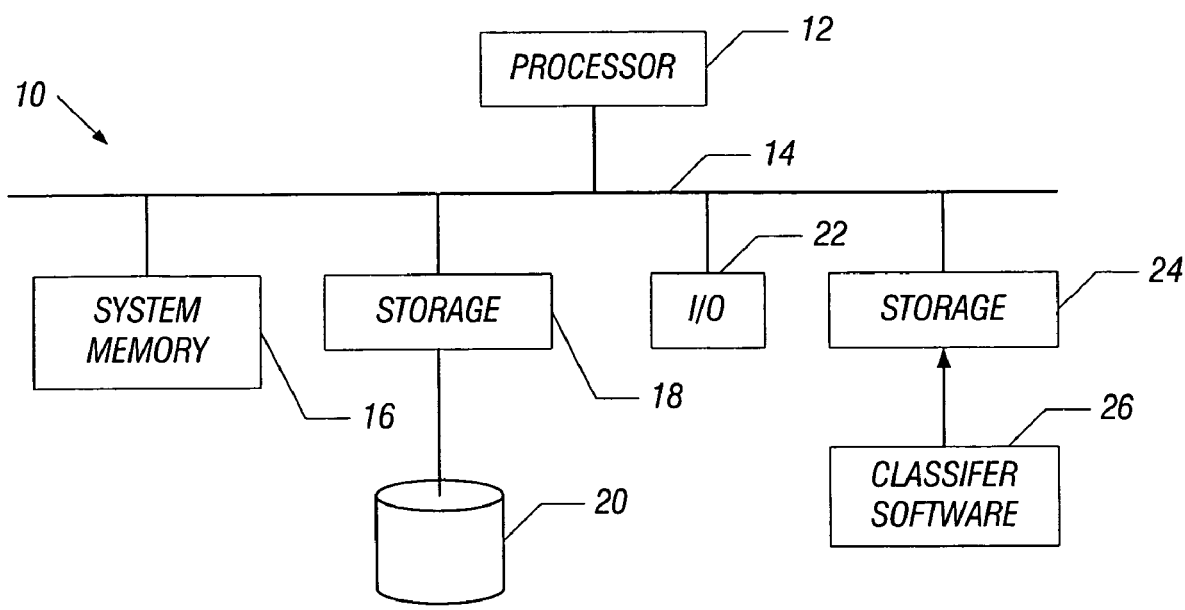
FIG. 12 is a block diagram of a system in accordance with one embodiment of the present invention.

Referring to FIG. 12, shown is a block diagram of a system in accordance with one embodiment of the present invention. As shown in FIG. 12, a computer system 10 may include a processor 12 coupled to a bus 14. The system 10 is only an example and the scope of the present invention is not limited to any particular architecture. In a simple example, the bus 14 may be coupled to a system memory 16 (which in one embodiment may be a dynamic random access memory (DRAM)), a storage 18, an input/output (I/O) device 22, and another storage 24. The storage 24 may store various software, including software 26, which may include multiple classification programs in accordance with an embodiment of the present invention. In various embodiments, software 26 may be loaded into system memory 16 prior to execution for faster operation. Of course, multiple software programs may be present. Data to be classified may be stored in a database 20 associated with storage 18.

As discussed, system 10 is representative and other systems may include more or different components, and such components may be differently arranged. For example, instead of the architecture of FIG. 12, a system may have a hub-based architecture, with a memory controller hub (MCH) coupled between processor 12 and system memory 16, and an I/O controller hub (ICH) coupled between the MCH and I/O devices, such as I/O device 22.

In various embodiments, system 10 of FIG. 12 may be a parallel machine. That is, in various embodiments, system 10 may be a highly parallel, cluster-like machine. In such an embodiment, multiple processor cores or multiple processors may be present, as represented by processor 12. In such embodiments, the processing of different random subsets may occur in parallel according to the parallel processing capabilities of such a distributed machine.

Thus in various embodiments, binary classifiers may be extended into continuous classifiers to predict continuous variables or to fit arbitrary functions. In such manner, these classifiers may handle control, sensor fusion and the like. Furthermore, embodiments of the present invention may be used to perform surface regressions and the like. For example, such methods of classifying continuous functions may be used in connection with search engines, robotics, and control systems, for example. Via such embodiments, classifications using large distributed clusters may be performed with distribution of the classification problems over the various clusters of a system.

Embodiments may be implemented in a computer program that may be stored on a storage medium having instructions to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   successively splitting an analog function corresponding to a voltage value obtained from a sensor of a control system in a computer of the control system into a high range and a low range and calculating a binary mask for the high range and the low range to obtain a plurality of data regions at a plurality of split levels;
   training binary classifiers on the plurality of data regions of at least one of the plurality of split levels by performing a training iteration on each of the plurality of data regions to obtain trained classifiers, each of the training iterations comprising setting one of the plurality of data regions as a first class and the remaining ones of the plurality of data regions as a second class;
   inputting a new data point of the analog function into the trained classifiers, and selecting the trained classifier having a greatest response; and
   outputting a level associated with the selected trained classifier from the computer.

2. The method of claim 1, further comprising determining a range of the analog function and a desired resolution.

3. The method of claim 2, further comprising determining a number of splits for the successive splitting based on the range and the desired resolution.

4. A method comprising:
   forming a plurality of random subsets in a computer system of an analog function of data obtained from a sensor of a control system;
   determining a fraction of training points at a given resolution range of a training set within each of the plurality of random subsets;
   retaining as a weak classifier any of the plurality of random subsets in which the fraction of training points is greater than a first threshold;
   determining a uniformity of the retained weak classifiers, and retaining a uniform subset of the retained weak classifiers; and
   classifying a test point of the analog function using the uniform subset.

5. The method of claim 4, wherein determining the fraction comprises dividing an intersection of the training points of the given resolution in a given subset and the training points of the training set by the training points of the given resolution.

6. The method of claim 4, further comprising classifying the training points with the uniform subset.

7. The method of claim 4, wherein classifying the test point comprises determining if an average of a function of the test point over the uniform subset is greater than a second threshold.

8. The method of claim 4, further comprising forming the plurality of random subsets using a parallel machine comprising the computer system.

9. An article comprising a computer-readable storage medium containing instructions that when executed enable a computer system to:
   successively split an analog function corresponding to a voltage value obtained from a sensor of a control system in the computer system into a high range and a low range and calculate a binary mask for the high range and the low range to obtain a plurality of data regions at a plurality of split levels;
   train binary classifiers on the plurality of data regions of at least one of the plurality of split levels by performing a training iteration on each of the plurality of data regions to obtain trained classifiers, each of the training iterations comprising setting one of the plurality of data regions as a first class and the remaining ones of the plurality of data regions as a second class;
   input a new data point of the analog function into the trained classifiers, and select the trained classifier having a greatest response; and output a level associated with the selected trained classifier from the computer system.

10. The article of claim 9, further comprising instructions that when executed enable the computer system to perform a training iteration on each of the plurality of data regions to obtain trained classifiers, in which each of the training iterations to set one of the plurality of data regions as a first class and the remaining ones of the plurality of data regions as a second class.

11. The article of claim 10, further comprising instructions that when executed enable the computer system to input a new data point into the trained classifiers, and select the trained classifier having a greatest response.

12. The article of claim 9, wherein the computer system comprises a parallel machine.

13. A system comprising:
  a processor; and
  a dynamic random access memory containing instructions that when executed by the processor enable the system to successively split an analog function into a high range and a low range and calculate a binary mask for the high range and the low range to obtain a plurality of data regions at a plurality of split levels, and train binary classifiers on the plurality of data regions of at least one of the plurality of split levels, train binary classifiers on the plurality of data regions of at least one of the plurality of split levels by performing a training iteration on each of the plurality of data regions to obtain trained classifiers, each of the training iterations comprising setting one of the plurality of data regions as a first class and the remaining ones of the plurality of data regions as a second class, input a new data point of the analog function into the trained classifiers, and select the trained classifier having a greatest response and output a level associated with the selected trained classifier from the system.

14. The system of claim 13, wherein the system comprises a parallel machine.

* * * * *